US011334764B2

(12) United States Patent
Zeng et al.

(10) Patent No.: US 11,334,764 B2
(45) Date of Patent: May 17, 2022

(54) REAL-TIME DETECTION METHOD AND APPARATUS FOR DGA DOMAIN NAME (71) Applicant: HAN SI AN XIN (BEIJING) SOFTWARE TECHNOLOGY CO., LTD, Beijing (CN)

(72) Inventors: Feng Zeng, Beijing (CN); Shuo Chang, Beijing (CN); Xiaochuan Wan, Beijing (CN)

(73) Assignee: HAN SI AN XIN (BEIJING) SOFTWARE TECHNOLOGY CO., LTD, Beijing (CN)

(*) Notice: Subject to any disclaimer, the term of this patent is extended or adjusted under 35 U.S.C. 154(b) by 189 days.

(21) Appl. No.: 16/764,741

(22) PCT Filed: Nov. 12, 2018

(86) PCT No.: PCT/CN2018/115087
§ 371 (c)(1),
(2) Date: May 15, 2020

(87) PCT Pub. No.: WO2019/096099
PCT Pub. Date: May 23, 2019

(65) Prior Publication Data
US 2021/0182612 A1 Jun. 17, 2021

(30) Foreign Application Priority Data
Nov. 15, 2017 (CN) ......................... 201711130020.0

(51) Int. Cl.
G06K 9/62 (2022.01)
G06N 3/08 (2006.01)
G06V 10/75 (2022.01)

(52) U.S. Cl.
CPC ......... G06K 9/6257 (2013.01); G06K 9/6269 (2013.01); G06K 9/6282 (2013.01); G06N 3/08 (2013.01); G06V 10/75 (2022.01)

(58) Field of Classification Search
CPC .. G06K 9/6257; G06K 9/6269; G06K 9/6282; G06V 10/75; G06N 3/08
See application file for complete search history.

(56) References Cited

U.S. PATENT DOCUMENTS 9,917,852 B1 * 3/2018 Xu ..................... H04L 63/0236
2012/0084860 A1 * 4/2012 Cao .................... H04L 63/1441
726/23

(Continued)

FOREIGN PATENT DOCUMENTS

CN 105577660 A 5/2016
CN 105610830 A 5/2016

(Continued)

OTHER PUBLICATIONS

Hyrum S. Anderson, Jonathan Woodbridge, and Bobby Filar. 2016. DeepDGA: Adversarially-Tuned Domain Generation and Detection. In <i>Proceedings of the 2016 ACM Workshop on Artificial Intelligence and Security. Association for Computing Machinery, New York, NY, USA, 13-21. (Year: 2016).*

(Continued)

Primary Examiner — Fayyaz Alam
(74) Attorney, Agent, or Firm — Westbridge IP LLC (57) ABSTRACT A real-time detection method and apparatus for DGA domain name. An original domain name is translated into a multi-dimensional numeric vector, the multi-dimensional numeric vector is input into a deep learning model pre-trained based on an ImageNet data set, to generate a domain name feature, a domain name classifier is trained based on the generated domain name feature, and a DGA domain name is classified and predicted based on the domain name classifier obtained by training. The method firstly uses a deep learning model pre-trained based on an ImageNet data set, from the field of visual image classification and detection, for real-time detection of a DGA domain name, avoiding the process of high-intensity training and parameter weight adjustment for the deep learning model in DGA domain name detection. The detection rate is higher, and detection speed is faster.

18 Claims, 7 Drawing Sheets (56) References Cited

U.S. PATENT DOCUMENTS

| | | | | |
|---|---|---|---|---|
| 2013/0191915 A1* | 7/2013 | Antonakakis | ........... | G06F 21/55 |
| | | | | 726/23 |
| 2016/0359887 A1 | 12/2016 | Yadav et al. | | |
| 2018/0288086 A1* | 10/2018 | Amiri | ................... | G06F 40/126 |
| 2019/0089721 A1* | 3/2019 | Pereira | ................ | H04L 61/1511 |

FOREIGN PATENT DOCUMENTS

| | | |
|---|---|---|
| CN | 105897714 A | 8/2016 |
| CN | 106911717 A | 6/2017 |

OTHER PUBLICATIONS

Woodbridge, J. et al., "Prediciting Domain Generation Algorithms with Long Short-Term Memory Networks," Cornell University arXiv Website, Available Online at https://arxiv.org/abs/1611.00791, Available as Early as Nov. 2, 2016, 13 pages.

ISA State Intellectual Property Office of the People's Republic of China, International Search Report Issued in Application No. PCT/CN2018/115087, dated Jan. 31, 2019, WIPO, 4 pages.

\* cited by examiner

REAL-TIME DETECTION METHOD AND APPARATUS FOR DGA DOMAIN NAME

CROSS-REFERENCE TO RELATED APPLICATIONS

The present application is a U.S. National Phase of International Patent Application Serial No. PCT/CN2018/115087 entitled "REAL-TIME DETECTION METHOD AND APPARATUS FOR DGA DOMAIN NAME," filed on Nov. 12, 2018. International Patent Application Serial No. PCT/CN2018/115087 claims priority to Chinese Patent Application No. 201711130020.0 filed on Nov. 15, 2017. The entire contents of each of the above-referenced applications are hereby incorporated by reference for all purposes.

FIELD OF THE INVENTION

The present invention relates to the technical field of network security, and in particular, to a method and a device for real-time detection of DGA domain name.

BACKGROUND OF THE INVENTION

A BotNet is a one-to-many control network formed between the the master controller (Botmaster) and the infected hosts (bots) through a Command and Control Server (referred to as a C2 server for short) by using one or more means of transmission to infect a large number of Bots with viruses, for the purpose of infecting as many hosts as possible. The BotNet is a dangerous potential threat to both network security operation and user data security protection.

At present, attackers who manipulate BotNets usually use multiple domain names to connect to the C2 server to control the victim's machine. These domain names are usually encoded in malicious programs, which also gives attackers a lot of flexibility, thus they can easily change these domain names and IP. The biggest advantage of this connection method is that it can be implemented with extremely simple code, and the disadvantage is that it is easily detected by the government. Domain Generation Algorithms (DGA) is a technology that uses random characters to generate C&C domain names (referred to as DGA domain names for short), thereby evading the blacklist detection of domain names. Through DGA, attackers can automatically generate thousands of domain names in a short time, which can effectively avoid domain name blacklists and government detection. The emergence of DGA has brought great threats to network security. For example, CryptoLocker, a ransomware virus that has swept the world some time ago, has adopted this domain name generation algorithm. Therefore, how to effectively detect DGA malicious domain names has been a research goal in the field of network security.

To achieve this goal, one of the existing detection methods is to collect DGA domain name samples and reverse the DGA to predict which domain names may be generated and pre-registered in the future and blacklist them. However, this solution has an obvious disadvantage. Because DGA can generate tens of thousands of domain names in a short period of time, it is impossible for network security personnel to repeatedly collect domain name samples and update blacklists every day.

Another classic detection technology is to implement characteristic extraction and classification of domain name data, which mainly includes two stages, namely characteristic engineering and classification algorithms. Characteristic engineering is one of the most tedious tasks, which mainly comprises two aspects:

1) Filter-based method: Alexa's top 1 million websites and blacklists are used to detect domain names;
2) Statistical characteristics-based method: typical statistical characteristics of domain names include, for example, domain name length, binary syntax, N-gram syntax, information entropy, lifetime, character frequency distribution, etc.

A Chinese patent application with a publication number of CN105577660A proposes a DGA domain name detection method based on a random forest. A Chinese patent application with a publication number of CN105897714A proposes a BotNet detection method based on DNS traffic characteristics. A US patent application with a publication number of US2013/0191915A1 also proposes a DGA domain name detection method and system. These patent applications use the above-mentioned classic statistical characteristic-based characteristic engineering method to achieve the detection of DGA domain name. There are some shortcomings in this detection method, for example, excessive reliance on artificial characteristic engineering, which is difficult to achieve; low detection rate and high false alarm rate; slow detection speed, which is unable to achieve real-time detection.

With the development of machine learning technology, especially deep learning technology in recent years, in view of the shortcomings of the above-mentioned classic DGA domain name detection technology, researchers have begun to explore solutions that use deep learning technology to detect DGA domain names. A public literature ("Predicting Domain Generation Algorithms with Long Short-Term Memory Networks", Woodbridge J et al., Https://arxiv.org/abs/1611.00791, November 2016) proposes a method for detecting a DGA domain name using a long-term and short-term memory network (LSTM). In this method, an LSTM model is trained based on a training dataset, a sequence of domain name characters is input into the LSTM model for characteristic extraction, and then classification and prediction are performed based on logistic regression classification. LSTM model is a special type of recurrent neural network that can learn long-term dependent information, such as text and language. This method performs automatic characteristic extraction based on the LSTM model, which eliminates the tedious step of characteristic engineering, and does not need to rely on context information. To a certain extent, real-time detection of DGA domain name has been achieved. However, this method requires a lot of training data to train the LSTM model, and the parameter weights of the model need to be adjusted during the training process, and the computational intensity of model training is relatively large. In addition, this model is more sensitive to class imbalances in the training set, and it also has insufficient detection capabilities for some DGA domain name families that lack sufficient training set support.

SUMMARY OF THE INVENTION

In an aspect, the present invention provides a method for real-time detection of DGA domain name, comprising the following steps:
step S1, converting an original domain name into a multi-dimensional numeric vector;
step S2, inputting the multi-dimensional numeric vector into a deep learning model pre-trained based on an ImageNet data set to generate a domain name characteristic;

step S3, training a domain name classifier based on the generated domain name characteristic;

step S4, classifying and predicting a DGA domain name based on the trained domain name classifier.

In some embodiments, the step S1 of converting an original domain name into a multi-dimensional numeric vector comprises the following steps:

step S11: converting a string of the original domain name into a multi-dimensional image byte matrix to match the input of a deep learning model pre-trained based on an ImageNet data set;

step S12, reducing the size of the multi-dimensional image byte matrix to a predetermined size.

In some embodiments, the method comprises the following step before the step S2:

step S2', normalizing the multi-dimensional image byte matrix which has been reduced to a predetermined size.

In some embodiments, generating the domain name characteristic in the step S2 comprises:

extracting a third-to-last layer of the pre-trained deep learning model to generate the domain name characteristic.

In some embodiments, the deep learning model pre-trained based on an ImageNet data set comprises: AlexNet model, VGG model, SqueezeNet model, Inception model, or ResNet model.

In some embodiments, the domain name classifier comprises a decision tree model, a support vector machine model, a logistic regression model, or a random forest model.

In some embodiments, training the domain name classifier based on the generated domain name characteristic in the step S3 comprises calculating a similarity distance between two domain names.

In some embodiments, training the domain name classifier based on the generated domain name characteristic in the step S3 comprises calculating an average characteristic value of the domain names in the domain name family as a characteristic of the domain name family.

In another aspect, the present invention provides a device for real-time detection of DGA domain name, comprising the following modules:

a conversion module configured to convert an original domain name into a multi-dimensional numeric vector;

a deep learning module configured to input the multi-dimensional numeric vector into a deep learning model pre-trained based on an ImageNet data set to generate a domain name characteristic;

a classifier training module configured to train a domain name classifier based on the generated domain name characteristic;

a prediction module configured to classify and predict a DGA domain name based on the trained domain name classifier.

In some embodiments, the conversion module comprises:

a pre-processing unit configured to convert a string of the original domain name into a multi-dimensional image byte matrix to match the input of a deep learning model pre-trained based on an ImageNet data set;

an adjusting unit configured to reduce the size of the multi-dimensional image byte matrix to a predetermined size.

In some embodiments, the detection device further comprises:

a normalization module configured to normalize the multi-dimensional image byte matrix which has been reduced to a predetermined size.

In some embodiments, the deep learning module extracts a third-to-last layer of the pre-trained deep learning model to generate a domain name characteristic.

In some embodiments, the deep learning model pre-trained based on an ImageNet data set comprises: AlexNet model, VGG model, SqueezeNet model, Inception model, or ResNet model.

In some embodiments, the domain name classifier comprises a decision tree model, a support vector machine model, a logistic regression model, or a random forest model.

In some embodiments, the classifier training module comprises:

a similarity calculation unit configured to calculate a similarity distance between two domain names.

In some embodiments, the classifier training module comprises:

a characteristic calculation unit configured to calculate an average characteristic value of the domain names in a domain name family as a characteristic of the domain name family.

In another aspect, the present invention provides a computer-readable storage medium having computer program instructions stored thereon, the computer program instructions are used to execute the following steps in a computer:

step S1, converting an original domain name into a multi-dimensional numeric vector;

step S2, inputting the multi-dimensional numeric vector into a deep learning model pre-trained based on an ImageNet data set to generate a domain name characteristic;

step S3, training a domain name classifier based on the generated domain name characteristic;

step S4, classifying and predicting a DGA domain name based on the trained domain name classifier.

In some embodiments, the step S1 of converting an original domain name into a multi-dimensional numeric vector comprises the following steps:

step S11: converting a string of the original domain name into a multi-dimensional image byte matrix to match the input of a deep learning model pre-trained based on an ImageNet data set;

step S12, reducing the size of the multi-dimensional image byte matrix to a predetermined size.

In some embodiments, the method comprises the following step before the step S2:

step S2', normalizing the multi-dimensional image byte matrix which has been reduced to a predetermined size.

In some embodiments, generating the domain name characteristic in the step S2 comprises:

extracting a third-to-last layer of the pre-trained deep learning model to generate the domain name characteristic.

In some embodiments, the deep learning model pre-trained based on an ImageNet data set comprises: AlexNet model, VGG model, SqueezeNet model, Inception model, or ResNet model.

In some embodiments, the domain name classifier comprises a decision tree model, a support vector machine model, a logistic regression model, or a random forest model.

In some embodiments, training the domain name classifier based on the generated domain name characteristic in the step S3 comprises calculating a similarity distance between two domain names.

In some embodiments, training the domain name classifier based on the generated domain name characteristic in the step S3 comprises calculating an average characteristic value of the domain names in the domain name family as a characteristic of the domain name family.

Another aspect of the present invention provides a computer device including a processor and a memory which stores computer program instructions, wherein the computer program instructions are used to execute the following steps when the processor is running:

step S1, converting an original domain name into a multi-dimensional numeric vector;

step S2, inputting the multi-dimensional numeric vector into a deep learning model pre-trained based on an ImageNet data set to generate a domain name characteristic;

step S3, training a domain name classifier based on the generated domain name characteristic;

step S4, classifying and predicting a DGA domain name based on the trained domain name classifier.

In some embodiments, the step S1 of converting an original domain name into a multi-dimensional numeric vector comprises the following steps:

step S11: converting a string of the original domain name into a multi-dimensional image byte matrix to match the input of a deep learning model pre-trained based on an ImageNet data set;

step S12, reducing the size of the multi-dimensional image byte matrix to a predetermined size.

In some embodiments, the method comprises the following step before the step S2:

step S2', normalizing the multi-dimensional image byte matrix which has been reduced to a predetermined size.

In some embodiments, generating the domain name characteristic in the step S2 comprises:

extracting a third-to-last layer of the pre-trained deep learning model to generate the domain name characteristic.

In some embodiments, the deep learning model pre-trained based on an ImageNet data set comprises: AlexNet model, VGG model, SqueezeNet model, Inception model, or ResNet model.

In some embodiments, the domain name classifier comprises a decision tree model, a support vector machine model, a logistic regression model, or a random forest model.

In some embodiments, training the domain name classifier based on the generated domain name characteristic in the step S3 comprises calculating a similarity distance between two domain names.

In some embodiments, training the domain name classifier based on the generated domain name characteristic in the step S3 comprises calculating an average characteristic value of the domain names in the domain name family as a characteristic of the domain name family.

In some embodiments, by using the knowledge advantage of the excellent deep learning model that has been pre-trained based on an ImageNet large-scale image dataset, through the word embedding conversion of domain name data and the transfer learning of deep learning model, the deep learning model pre-trained based on an ImageNet data set, from the field of visual image classification detection, is applied for the first time to the detection of DGA domain name, which avoids the high-intensity training and parameter weight adjustment process of a deep learning model in DGA domain name detection, has a higher detection rate and a lower false alarm rate, and has a faster detection speed.

DETAILED DESCRIPTION OF THE INVENTION

The present invention will be clearly and completely described with reference to the accompanying drawings.

Figure 1:
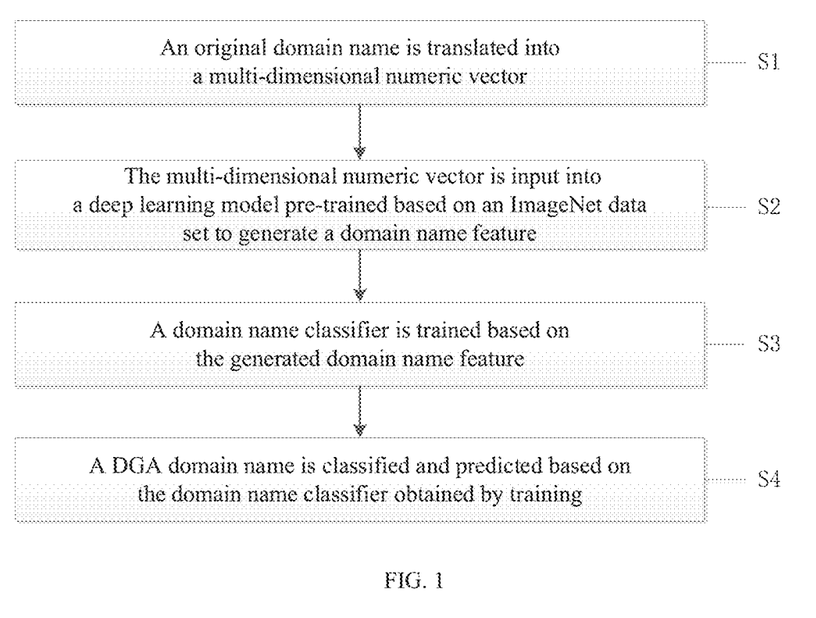
FIG. 1 is a schematic flowchart of a method for real-time detection of DGA domain name according to an embodiment of the present invention.

FIG. 1 is a schematic flowchart of a method for real-time detection of DGA domain name according to an embodiment of the present invention. As shown in FIG. 1, the method comprises the following steps:

step S1, converting an original domain name into a multi-dimensional numeric vector;

step S2, inputting the multi-dimensional numeric vector into a deep learning model pre-trained based on an ImageNet data set to generate a domain name characteristic;

step S3, training a domain name classifier based on the generated domain name characteristic;

step S4, classifying and predicting a DGA domain name based on the trained domain name classifier.

In the embodiment of the present invention, the ImageNet data set is the name of a currently well-known computer vision system recognition project, which is currently the largest database for image recognition in the world, and contains more than 10 million manually labelled pictures and more than 20,000 object categories. Based on this large-scale dataset, some excellent deep learning models have been developed and trained, such as AlexNet model, VGG model, SqueezeNet model, Inception model or ResNet model. At present, these excellent deep learning models are mainly used in computer vision recognition, speech recognition, natural language processing and other technical fields, and have achieved great success in these areas, but no precedent has been found in the field of computer network security, especially DGA domain name detection.

Therefore, there are two main difficulties in how to apply these pre-trained deep learning models based on an ImageNet data set to DGA domain name detection:

First, DGA domain name as a learning and classification object is essentially a type of character data, which is different from the original image data in ImageNet data set in terms of both size and content;

Second, for the detection of domain name, the domain name data that needs to be processed can reach millions of levels. Re-training a deep learning model based on these massive domain name data will face huge computational intensity and consume a lot of time and resources.

The embodiment of the present invention addresses the above two difficulties. First, the original domain name data of character type is converted into an image format of multi-dimensional numeric vectors by word embedding technology, so that domain name data, like the image data in ImageNet data set, can also be processed by a deep learning model pre-trained based on an ImageNet data set. Word embedding is a term in natural language processing, which is mathematically defined as a mapping from document space projection to numeric vector space (usually low-dimensional). The mapping is an injective function, that is, each Y has only a unique X correspondence, and vice versa. Through word embedding technology, the document type data can be numerically processed, thereby transforming the document analysis problem into a problem of corresponding numeric vectors.

Second, with the help of transfer learning theory, the parameter weights of a deep learning model pre-trained based on an ImageNet data set are directly transferred to the target learning model for the domain name dataset after word embedding conversion, thereby effectively utilizing the knowledge and experience of the excellent deep learning models evolved based on an ImageNet data set training, which avoids the high-intensity training and parameter weight adjustment process of deep learning models based on large-scale domain name data, and meanwhile makes the detection of DGA domain name have higher detection rate and lower false positives when ensuring real-time performance rate.

In some embodiments, the deep learning model pre-trained based on an ImageNet data set comprises: AlexNet model, VGG model, SqueezeNet model, Inception model, or ResNet model.

In some embodiments, generating the domain name characteristic in the step S2 comprises extracting a third-to-last layer of the pre-trained deep learning model to generate the domain name characteristic. This is because in a pre-trained deep learning model, the top output layer usually has over-fitting problems, and characteristics of layers lower than the top output layer tend to be more suitable for classification.

In some implementations, the domain name classifier comprises a decision tree model, a support vector machine model, a logistic regression model, or a random forest model.

In some embodiments, training the domain name classifier based on the generated domain name characteristic in the step S3 further comprises calculating a similarity distance between two domain names. The similarity score of the Euclidean distance between two domain names helps to improve the accuracy of classification.

In some embodiments, training the domain name classifier based on the generated domain name characteristic in the step S3 comprises calculating an average characteristic value of the domain names in the domain name family as a characteristic of the domain name family. In the real world, DGA domain names have multiple domain name families. For the detection of these domain name families, the embodiment of the present invention calculates the characteristic average of the domain names in the domain name family as the characteristics of the domain name family, so that the classification detection of the DGA domain name family can be implemented.

Figure 2:
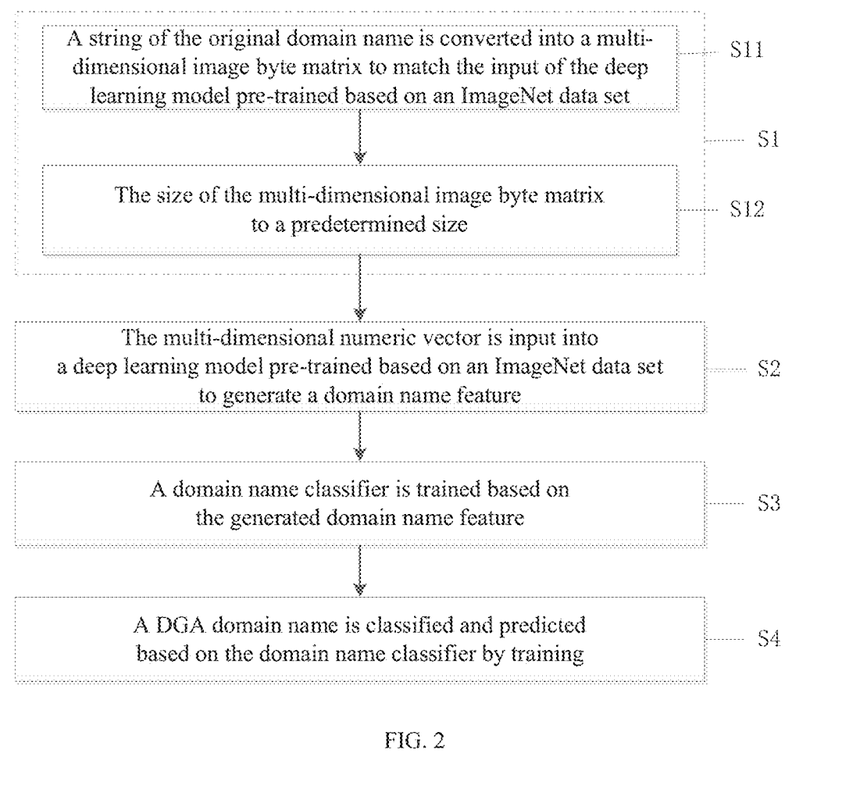
FIG. 2 is a schematic flowchart of a method for real-time detection of DGA domain name according to another embodiment of the present invention.

FIG. 2 is a schematic flowchart of a method for real-time detection of DGA domain name according to another embodiment of the present invention. As shown in FIG. 2, based on the embodiment shown in FIG. 1, the step S1 of converting an original domain name into a multi-dimensional numeric vector according to the embodiment of the present invention comprises:

step S11: converting a string of the original domain name into a multi-dimensional image byte matrix to match the input of a deep learning model pre-trained based on an ImageNet data set;

step S12, reducing the size of the multi-dimensional image byte matrix to a predetermined size.

In the embodiment of the present invention, the step S2 comprises inputting the multi-dimensional image byte matrix into a deep learning model pre-trained based on an ImageNet data set to generate a domain name characteristic.

In the embodiment of the present invention, the original domain name is converted into a multi-dimensional image byte matrix. Since the length of the domain name string is smaller than that of general image data, reducing the size of the converted image byte matrix to a predetermined size can significantly reduce the occupation of memory space.

Figure 3:
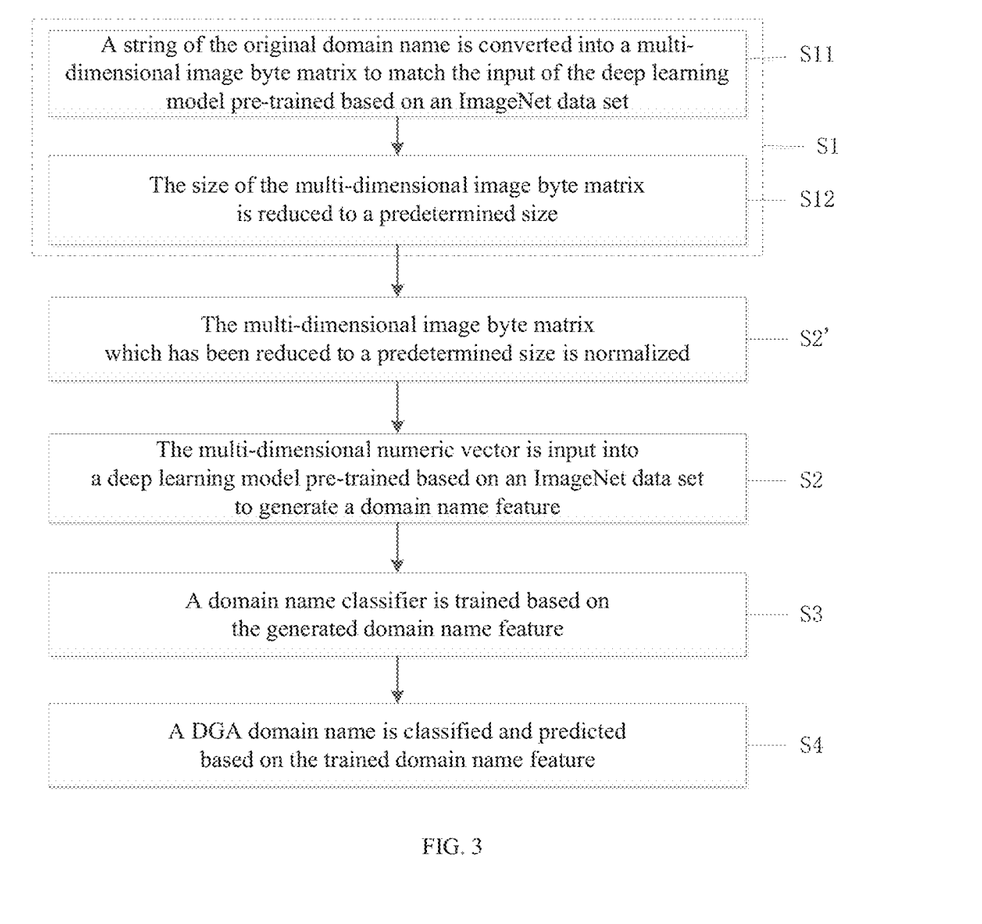
FIG. 3 is a schematic flowchart of a method for real-time detection of DGA domain name according to another embodiment of the present invention.

FIG. 3 is a schematic flowchart of a method for real-time detection of DGA domain name according to another embodiment of the present invention. As shown in FIG. 3, the method further comprises the following step before the step S2 of the embodiment shown in FIG. 2:

step S2', normalizing the multi-dimensional image byte matrix which has been reduced to a predetermined size.

In the embodiment of the present invention, by normalizing the multi-dimensional image byte matrix after the word embedding conversion, the vector representation of the domain name data is more standard and standardized, and the classification accuracy of the domain name is further improved.

Figure 4:
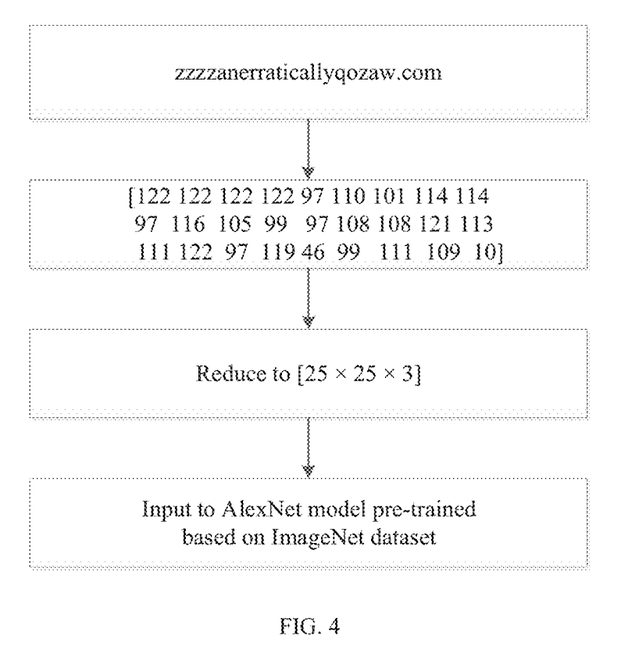
FIG. 4 is an application example diagram of an embodiment of domain name conversion according to the present invention.

FIG. 4 is an application example diagram of an embodiment of domain name conversion according to the present invention. As shown in FIG. 4, in the embodiment of the present invention, a DGA generated domain name zzzzan-erraticallyqozaw.com is taken as an example. First, the domain name string is converted into an image byte matrix of [224×224×3] by word embedding. Since the maximum length of the domain name string usually does not exceed 25, we can further reduce the size of the image byte matrix of [224×224×3] to [25×25×3], and finally it is input into a AlexNet deep learning model pre-trained based on an ImageNet data set to generate a domain name characteristic. Thus, the size of the converted image byte matrix is reduced to a predetermined size, which can significantly reduce the memory space occupation.

Figure 5:
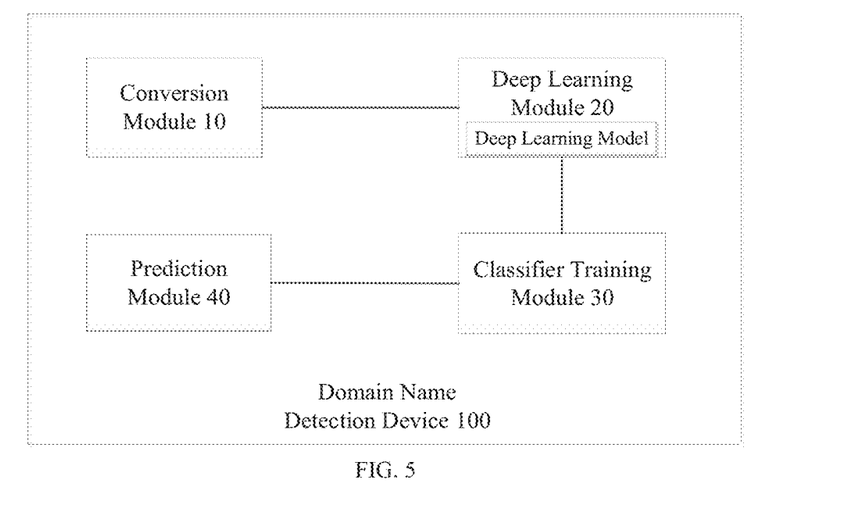
FIG. 5 is a schematic structural diagram of a device for real-time detection of DGA domain name according to an embodiment of the present invention.

FIG. 5 is a schematic structural diagram of a device for real-time detection of DGA domain name 100 according to an embodiment of the present invention. As shown in FIG. 5, the device for real-time detection of DGA domain name 100 comprises the following modules:

a conversion module 10 configured to convert an original domain name into a multi-dimensional numeric vector;

a deep learning module 20 configured to input the multi-dimensional numeric vector into a deep learning model pre-trained based on an ImageNet data set to generate a domain name characteristic;

a classifier training module 30 configured to train a domain name classifier based on the generated domain name characteristic;

a prediction module 40 configured to classify and predict a DGA domain name based on the trained domain name classifier.

Figure 6:
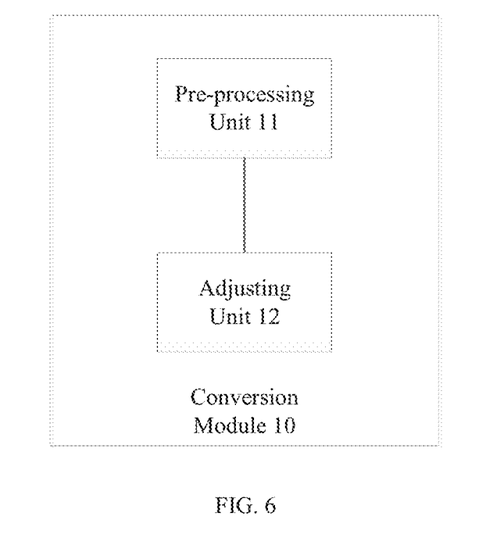
FIG. 6 is a schematic structural diagram of a conversion module according to an embodiment of the present invention.

FIG. 6 is a schematic structural diagram of a conversion module 10 according to an embodiment of the present invention. As shown in FIG. 6, the conversion module 10 comprises the following units:

a pre-processing unit 11 configured to convert a string of the original domain name into a multi-dimensional image byte matrix to match the input of a deep learning model pre-trained based on an ImageNet data set;

an adjusting unit 12 configured to reduce the size of the multi-dimensional image byte matrix to a predetermined size.

Figure 7:
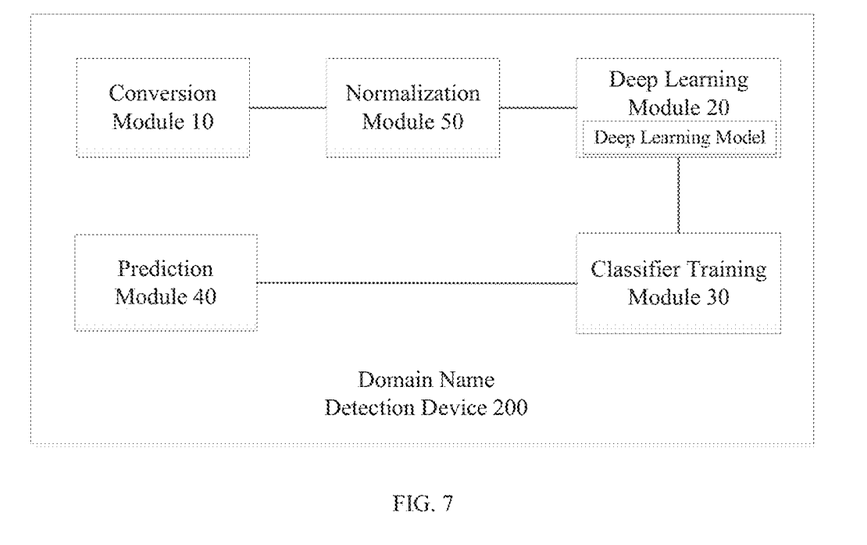
FIG. 7 is a schematic structural diagram of a device for real-time detection of DGA domain name according to another embodiment of the present invention.

FIG. 7 is a schematic structural diagram of a device for real-time detection of DGA domain name 200 according to another embodiment of the present invention. As shown in FIG. 7, the device for real-time detection of DGA domain name 200 further comprises the following modules in addition to the device for real-time detection of DGA domain name 100 shown in FIG. 5:

a normalization module 50 configured to normalize the multi-dimensional image byte matrix which has been reduced to a predetermined size.

Figure 8:
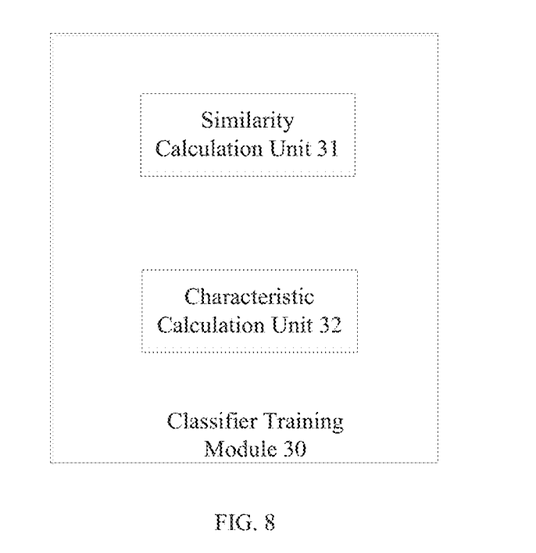
FIG. 8 is a schematic structural diagram of a classifier training module according to an embodiment of the present invention.

FIG. 8 is a schematic structural diagram of a classifier training module 30 according to an embodiment of the present invention. As shown in FIG. 8, the classifier training module 30 includes the following units:

a similarity calculation unit 31 configured to calculate a similarity distance between two domain names.

a characteristic calculation unit 32 configured to calculate an average characteristic value of the domain names in a domain name family as a characteristic of the domain name family.

The embodiment of the present invention selected the first 1 million domain names of Alexa as non-DGA domain names, and selected 33 million real DGA malicious domain names as test data, which included 64 domain name families. Various deep learning models pre-trained based on an ImageNet data set were used to classify and detect the above data, and the experimental results are shown in Table 1. It can be seen that the true positive rate of the DGA domain name detection in the embodiments of the present invention can be as high as 99.863% and the accuracy rate can be 98.568%.

Figure 9:
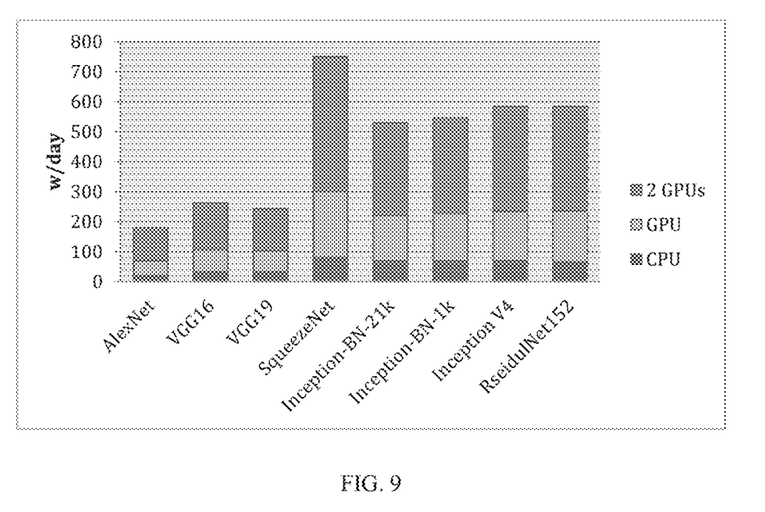
FIG. 9 is a comparison diagram of DGA domain name detection speed performance according to an example of the present invention.

FIG. 9 is a comparison diagram of DGA domain name detection speed performance according to an example of the present invention. As shown in FIG. 9, the image data processing capabilities of GPU are utilized. When one GPU is used to run the detection method of the present invention, the amount of domain name data processed per day is more than twice the number of domain names processed when one CPU is run. When two GPUs are used to run the detection method of the present invention, the amount of domain name data that can be processed per day can reach a maximum of 5 million or more.

TABLE 1

Experimental results of model testing

| Model | True positive rate | False positive rate | Accuracy |
|---|---|---|---|
| AlexNet | 0.967086 | 0.02391 | 0.97231 |
| VGG16 | 0.97819 | 0.02125 | 0.97296 |
| VGG19 | 0.97258 | 0.01714 | 0.97039 |
| SqueezeNet | 0.97461 | 0.01942 | 0.97198 |
| Inception-BN-21k | 0.97882 | 0.01831 | 0.97596 |
| Inception-BN-1k | 0.98519 | 0.0161 | 0.98196 |
| Inception V4 | 0.99863 | 0.01128 | 0.98568 |
| ResidulNet152 | 0.99317 | 0.01659 | 0.98273 |

The above experimental results show that some embodiments of the present invention for the first time applies a deep learning model pre-trained based on an ImageNet data set, from the field of visual image classification detection, to the real-time detection of DGA domain name, which avoids the high-intensity training and parameter weight adjustment process of the deep learning model in DGA domain name detection, has a higher detection rate and a lower false alarm rate, and has a faster detection speed.

The invention claimed is:

1. A method for real-time detection of DGA domain name, comprising the following steps:
    step S1, converting an original domain name into a multi-dimensional numeric vector;
    step S2, inputting the multi-dimensional numeric vector into a deep learning model pre-trained based on an ImageNet data set to generate a domain name characteristic;
    step S3, training a domain name classifier based on the generated domain name characteristic;
    step S4, classifying and predicting a DGA domain name based on the trained domain name classifier.

2. The method according to claim 1, wherein the step S1 of converting an original domain name into a multi-dimensional numeric vector comprises the following steps:
    step S11, converting a string of the original domain name into a multi-dimensional image byte matrix to match the input of a deep learning model pre-trained based on an ImageNet data set;
    step S12, reducing the size of the multi-dimensional image byte matrix to a predetermined size.

3. The method according to claim 2, further comprising the following step before the step S2: step S2', normalizing the multi-dimensional image byte matrix which has been reduced to a predetermined size.

4. The method according to claim 3, wherein generating a domain name characteristic in the step S2 comprises: extracting a third-to-last layer of the pre-trained deep learning model to generate a domain name characteristic.

5. The method according to claim 4, wherein the deep learning model pre-trained based on an ImageNet data set comprises: AlexNet model, VGG model, SqueezeNet model, Inception model, or ResNet model.

6. The method according to claim 5, wherein the domain name classifier comprises a decision tree model, a support vector machine model, a logistic regression model, or a random forest model.

7. The method according to claim 6, wherein training a domain name classifier based on the generated domain name characteristic in the step S3 comprises: calculating a similarity distance between two domain names.

8. The method according to claim 7, wherein training a domain name classifier based on the generated domain name characteristic in the step S3 comprises: calculating an average characteristic value of the domain names in the domain name family as a characteristic of the domain name family.

9. A device for real-time detection of DGA domain name, comprising the following modules:
    a conversion module configured to convert an original domain name into a multi-dimensional numeric vector;
    a deep learning module configured to input the multi-dimensional numeric vector into a deep learning model pre-trained based on an ImageNet data set to generate a domain name characteristic;

a classifier training module configured to train a domain name classifier based on the generated domain name characteristic;

a prediction module configured to classify and predict a DGA domain name based on the trained domain name classifier.

10. The device according to claim 9, wherein the conversion module comprises:

a pre-processing unit configured to convert a string of the original domain name into a multi-dimensional image byte matrix to match the input of the deep learning model pre-trained based on an ImageNet data set;

an adjusting unit configured to reduce the size of the multi-dimensional image byte matrix to a predetermined size.

11. The device according to claim 10, wherein the detection device further comprises:

a normalization module configured to normalize the multi-dimensional image byte matrix which has been reduced to a predetermined size.

12. The device according to claim 11, wherein the deep learning module extracts a third-to-last layer of the pre-trained deep learning model to generate a domain name characteristic.

13. The device according to claim 12, wherein the deep learning model pre-trained based on an ImageNet data set comprises: AlexNet model, VGG model, SqueezeNet model, Inception model, or ResNet model.

14. The device according to claim 13, wherein the domain name classifier comprises a decision tree model, a support vector machine model, a logistic regression model, or a random forest model.

15. The device according to claim 14, wherein the classifier training module comprises:

a similarity calculation unit configured to calculate a similarity distance between two domain names.

16. The device according to claim 15, wherein the classifier training module comprises:

a characteristic calculation unit configured to calculate an average characteristic value of the domain names in a domain name family as a characteristic of the domain name family.

17. A non-transitory computer-readable storage medium having computer program instructions stored thereon, the computer program instructions are used to execute the following steps in a computer: step S1, converting an original domain name into a multi-dimensional numeric vector; step S2, inputting the multi-dimensional numeric vector into a deep learning model pre-trained based on an ImageNet data set to generate a domain name characteristic; step S3, training a domain name classifier based on the generated domain name characteristic; step S4, classifying and predicting a DGA domain name based on the trained domain name classifier.

18. The storage medium according to claim 17, wherein the step S1 of converting an original domain name into a multi-dimensional numeric vector comprises the following steps:

step S11: converting a string of the original domain name into a multi-dimensional image byte matrix to match the input of a deep learning model pre-trained based on an ImageNet data set;

step S12, reducing the size of the multi-dimensional image byte matrix to a predetermined size.

\* \* \* \* \*